Dec. 18, 1951   N. HUDSON   2,579,319
SAFETY CHAIN HOOK FOR TRAILERS
Filed Oct. 20, 1950   2 SHEETS—SHEET 1
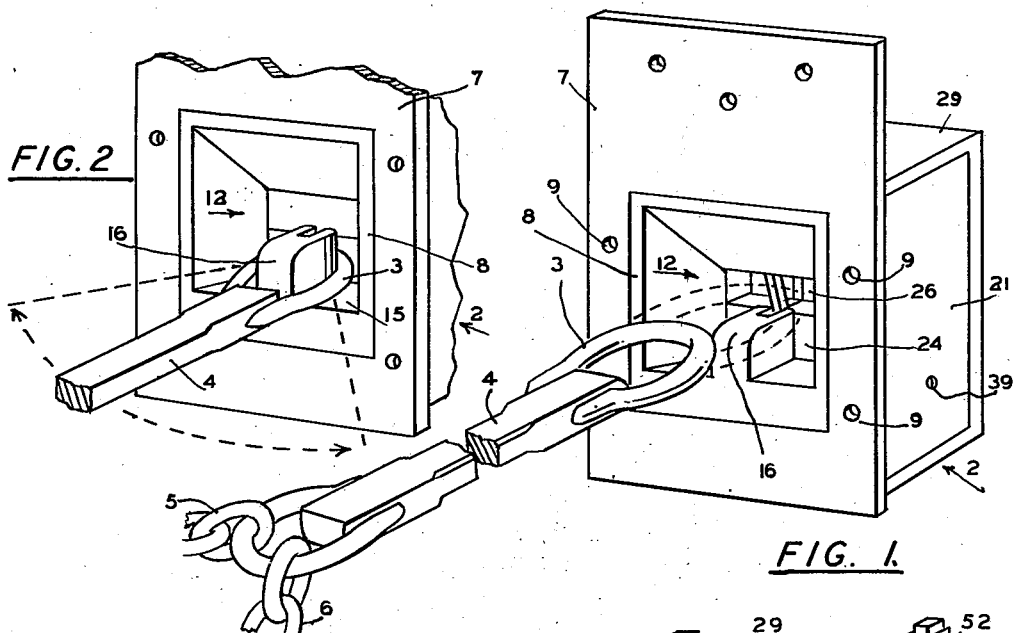
Inventor
NEAL HUDSON
By Scott L. Norviel
Attorney

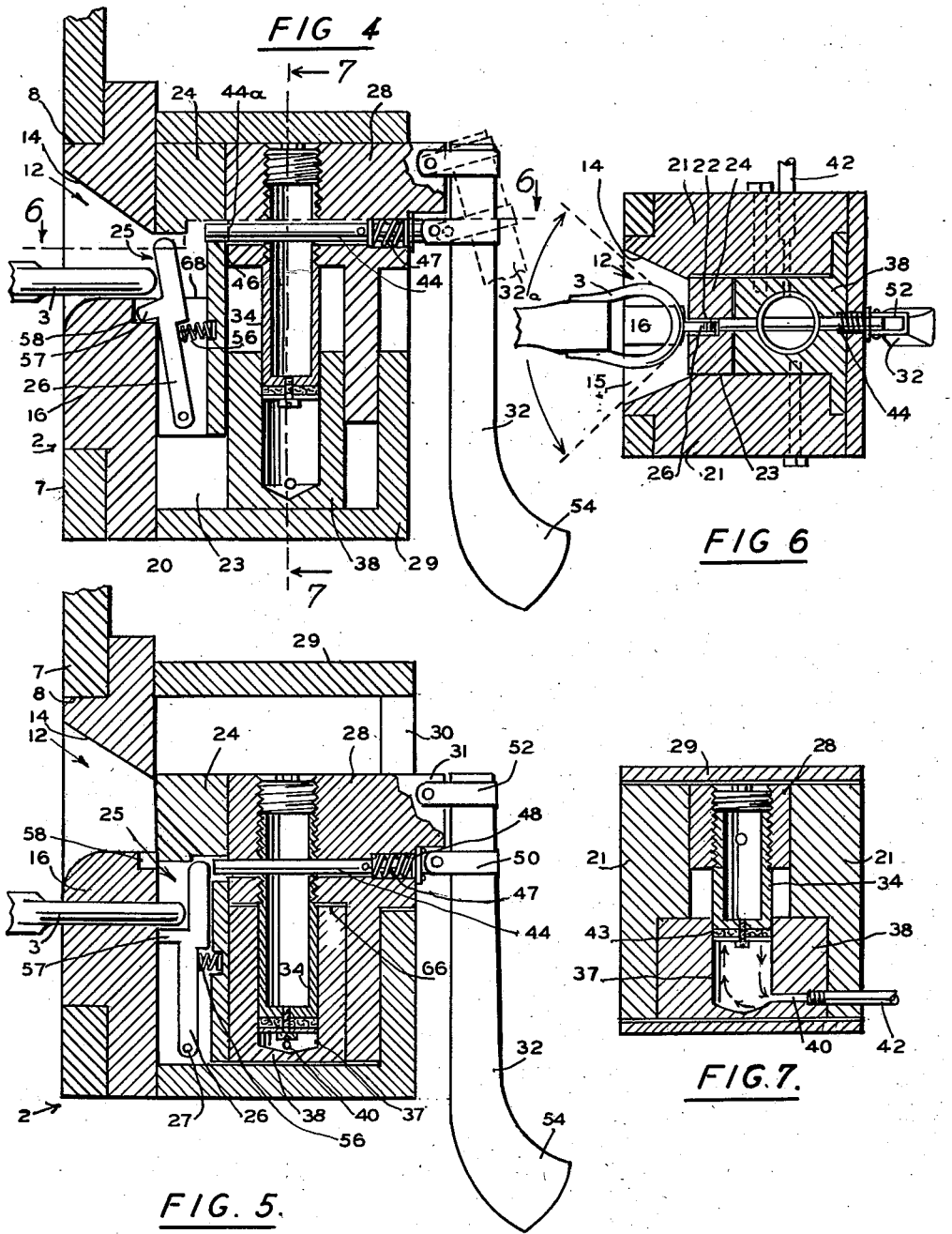

Patented Dec. 18, 1951

2,579,319

UNITED STATES PATENT OFFICE 2,579,319

SAFETY CHAIN HOOK FOR TRAILERS

Neal Hudson, Phoenix, Ariz.

Application October 20, 1950, Serial No. 191,215

5 Claims. (Cl. 280—33.15)

This invention pertains to safety chain hooks used to attach the safety chains of trailers or the like to the traction vehicle.

One of the objects of the invention is to provide a hook which will receive and hold a chain ring or loop and latch it in place so that it cannot become unhooked until desired.

Another object is to provide trailer safety chains with a junction bar at the front end which has a ring adapted to engage over a hook prong in a hooking block which has mechanism adapted to hold the ring in place when desired by the user, or to release and eject it when desired;

Another object is to provide a hooking block, as above mentioned, with means for hydraulic or pneumatic operation of the locking mechanism, and with means for easily disconnecting this mechanism and operating the locking and ejecting mechanism by manual means.

Another object is to provide instant coupling and uncoupling for a trailer chain hook latch.

Still another object is to provide a device as above mentioned with means for manual coupling and uncoupling independent of the pneumatic coupling or uncoupling mechanism;

A further object is to provide a coupler of the type described with an arrangement of parts so that in case of the failure of any of the pneumatically operated latching parts the latching mechanism will be held latched by gravity and unlatching will not take place until desired by the user.

I attain the foregoing objects by means of the devices, structure, and combination of parts shown in the accompanying drawings, in which—

Figure 1 is a perspective view of the safety chain joining bar and loop, and the hook and latching block and attaching plate in open position.

Figure 2 is a fragmentary perspective view of said hook and latching block with the parts moved to closed or latched position on the chain joining bar loop.

Figure 3 is an expanded view of the various parts of the latching block drawn in perspective and placed in positions generally related to those occupied by them when the latching bar is assembled.

Figure 4 is a vertical mid-sectional side view of the latching block with the latching parts open.

Figure 5 is a similar view but with the latching parts closed.

Figure 6 is a horizontal sectional view of said latching mechanism drawn on a somewhat reduced scale, and taken substantially on line 6—6 of Figure 4; and Figure 7 is a vertical transverse section of said mechanism taken substantially on line 7—7, Figure 4, and drawn on a reduced scale.

Similar numerals refer to similar parts in the several views.

In the drawings 2 indicates, generally the body of a hook and latching mechanism for receiving and holding the loop 3 on the end of junction bar 4 which joins trailer safety chains 5 and 6. Numeral 7 indicates a steel attaching plate, into which the square boss 8 on the front face of body 2 fits, and to which this body is attached by means of screws extending through holes 9. It is to be understood that plate 7 is attached to some adequate support or body member on the rear portion of the traction vehicle and that the safety chains are to be attached to the front portion of the trailer in the usual manner.

In the central portion of the outer face of boss 8 there is an opening 12 to receive chain bar loop 3. The side and top faces 14 of this opening converge inwardly. In the center of the bottom face 15 there is an upwardly extending boss 16 which forms a hook prong over which loop 3 may be hooked to secure it and bar 4 to latching body 2, and thus join chains 5 and 6 of the trailer to the traction vehicle. This prong is made integral with the outer plate portion 18 of the body 2. Cheeks 21 extend rearward from the front portion 2 and enclose a vertical latch slideway 23.

Latch block 24 slides vertically in this slideway. Its front face is notched horizontally at 25 to receive the outer portion of loop 3 when it is inserted in opening 12. It is also vertically notched at 22 to receive a latch or trigger bar 26 which is pivotally supported on a transverse pin 27 at the bottom.

Up and down movement of latch block 24 is provided by piston block 28 which slides vertically between the rear portions of cheeks 21. Both sliding parts are held in place by the C shaped back closing case 29. The back face of this case part is slotted at 30 to receive the boss 31 to which the uncoupling or disconnecting handle 32 is pivoted. Piston 34 is threaded into the forwardly projecting portion 64 of block 28. The piston works in cylinder bore 37 in cylinder block 38 which is secured in the lower part of the back portion of body part 2 between the cheeks 21 by screws extending through holes 39. Air or fluid enters and leaves the bottom of cylinder 37 through port 40 which is threaded to receive pipe 42. Packing leathers or piston rings 43 are secured to the bottom of piston 34.

Latching block 24 can be forced to slide up and down by coupling rod 44 which engages in hole 46 in its rear face and slides loosely in piston block 28. A spring 47 normally holds it in coupled position on rod 44 by thimble 48 which is attached to the rear face of piston block 28 by screws. The rear end of rod 44 is attached by a pin to clevis 50 on handle 32. The handle is, in turn, attached to boss 31 by clevis 52 and a pin. Handle 32 has a rather large and heavy rearwardly extending portion 54 at its bottom which tends to keep it hanging in a vertical position and keeps coupling rod 44 in engaged position as shown in Figure 4.

Trigger 26 pivoted on pin 27 at its lower end tilts forward and rearward in slot 22. It is normally held forward by spring 56. A dog 57 formed on its forward face is adapted to engage in a notch 58 which is formed in the rear face of hook prong 16. When latch block 24 slides upward to the unlatching position shown in Figure 4, the trigger tilts outward under the urge of spring 56 and the dog 57 engages in notch 58 and holds the block in this raised position.

The upper end portion of this trigger extends vertically across horizontal transverse notch 25. When latch block 24 is in the raised position the upper part of trigger 26 extends vertically across the inner portion of opening 12 in block 2 as shown in Figure 4.

In use, the block 2 is attached to the rear end of a traction vehicle by plate 7. Pipe 42 is attached to a source of compressed air, and a vacuum or reduced air pressure source, through a double acting valve (not shown) positioned in the operator's compartment of the traction vehicle. The reduced air pressure may be obtained from the intake manifold of the engine; the pressure from an air brake pump, or the like.

The latch block is opened by applying air pressure to cylinder 37. This forces piston 34 and piston block 28 upward to the position shown in Figure 4. It is maintained in this position by engagement of trigger dog 57 in hook notch 58. Vacuum may then be applied. The ring 3 on bar 4 may then be inserted in opening 12 above hook 16, and as the ring is pushed against the upper end of trigger 26, dog 57 is disengaged from notch 58. The ring then surrounds hook 16, and, as block 24 drops, together with block 28, the inner part of ring 3 is held down, on hook 16 by the upper face or edge of notch 25. The mechanism may then be said to be locked or latched as shown in Figure 5. Obviously this requires that the coupling rod 44 remain in the coupling position. This coupling position is maintained by spring 47 and the weighted end 54 of coupling handle 32. As above explained this rod operatively joins blocks 24 and 28 so that they slide up or down together. The upward motion of block 28 is limited by lugs 60 on its bottom lateral portions. These lugs run in grooves 62 in block 38 and their upward movement is stopped by contact with portions of cheeks 21 which overhang these notches. Motion of piston block 28 downward is limited by contact of its overhanging inwardly extending part 64 with the upper face 66 of cylinder block 38.

From the foregoing it will be understood that ring 3 may be latched or locked on hook 16 as shown in Figure 5 by operation of an air valve, not shown, in the vehicle cab. Latch block 24 is held down in latched position by vacuum in cylinder 37 together with its own weight and the weight of block 28. Latch block 24 may be raised and ring 3 released by applying air pressure to piston 34. This moves block 24 back to the position shown in Figure 4 and the bottom face 68 of notch 25 as well as dog 57 on trigger 26 lifts ring 3 above hook 16. The trigger then moves it outward, as the dog enters notch 58. The ring and bar are in this way released and may be moved from opening 12 in block 20. The parts may then be said to be unlatched. The foregoing sequence of operations concerns latching and unlatching by pneumatic power means; that is the latch block is moved to unlatched position by air pressure applied to cylinder 37, and is returned to and held in latched position by vacuum, in this cylinder, after ring 3 is inserted into opening 12 to release trigger dog 57. This is the mode of operation most frequently used. The truck operator, after unhitching the trailer, may unlatch the safety chains merely by turning the air valve in the truck cab so as to apply pressure to pipe 42. This will unlatch chain ring 3 and either eject it or permit it to drop to the ground. If the truck and trailer are equipped with an air operated tongue coupler, it is unnecessary for the operator to leave the cab to effect uncoupling. The operator then turns the air valve so that vacuum (reduced air pressure) is again applied to pipe 42. The latch block does not move because it is held in the unlatched (open) position by dog 57 on trigger 26. When it is desired to rehitch and reattach chains 5 and 6 ring 3 is inserted in opening 12 until it is over hook 16 and trips trigger 26 inward. The urge of the vacuum, together with the weight of blocks 24 and 28, then immediately moves block 24 downward to latched position securing ring 3 in place.

Should the operator, however, fail to turn the valve in the cab to the position to apply vacuum to pipe 42, and, having dismounted, find the latch block forcefully held open by air pressure, it is not necessary to re-enter the cab and reset the air valve. Latch block 24 may be uncoupled from piston block 28 by moving handle 32 away from block body 2 so as to draw coupling rod 44 out from hole 46 in latch block 24 as shown in dotted lines 32a and 44a in Figure 4. Coupling block 24 is then free to drop, by its own weight when trigger 26 is released by the insertion of ring 3 into opening 12 and notch 25. Downward motion of block 24 can also be urged by contact of the ring on the lower face 68 of notch 25. The weight of block 24 is sufficient to hold the parts in latched position. Thereafter, when the operator enters the cab he can turn the air valve to apply vacuum to pipe 42. Block 28 will then move downward and when coupling rod 44 moves into registering position with hole 46 it will move to coupling position under the urge of spring 47. Blocks 24 and 28 are then again coupled.

When for any reason air pressure is not available this device may be used to couple and uncouple the safety chains 5 and 6 as follows:

Commencing with the parts in closed or latched position, as shown in Figure 5, block 24 along with 28 may be moved to unlatched position by grasping the handle 32 and sliding it upward. This motion is transferred through lug 31 to block 28 and, since blocks 24 and 28 are coupled, block 24 moves upward, also, until trigger dog 57 engages notch 58. Ring 3, if previously in place, may then be removed. Reentry of ring 3 into opening 12 will contact trigger 26, release dog 57 and permit both blocks to drop downward by their own weight. This downward motion may be aided by a downward pull on handle 32. The weight of these parts is adequate to keep them in latched position.

To those familiar with the art it will be apparent that ring 3 may be any end ring of a trailer safety chain. The two chains need not necessarily be brought together and provided with a handle 4 as here shown. Also, for the purposes of description and fundamental operation some of the separate parts may be considered and grouped together. Thus body block 2, C-shaped back closing case 29 and piston block 38 may be considered as the latching block body, and since many substitutions and equivalents are possible I wish to be limited only by the following claims.

I claim:

1. A safety chain hook for receiving, holding and releasing a safety chain ring, comprising in combination, a hook body having an outer portion, an opening in the face thereof having inwardly converging side and top walls, and a bottom wall having a vertical hook formed thereon extending toward but separated from said top wall having a notch at the top of its inner face, and laterally positioned inwardly extending cheeks enclosing vertical slides; a latch block having a transverse horizontal notch on its outer face adapted to receive a portion of said chain ring, a trigger bar hinged to the lower portion of said block, extending upward into said horizontal notch, and having a dog on its outer face adapted to engage said hook notch to latch said latch block in raised position with said horizontal notch in register with the opening in said body; a piston block vertically slidable between the cheeks of said body inwardly from said latch block; a coupling rod operative between said piston block and said latch block to normally couple said blocks so that they slide together; a handle pivoted to the inner portion of said piston block and extending outward and downward from said case adapted to provide a means for manually raising and lowering said piston block, and connected to said coupling rod so that hinging motion of said handle will slide said rod to uncoupled position relative to said latch block; and a piston on said piston block operative as a cylinder within said body connected to a pipe adapted to be connected to a source of air pressure and vacuum.

2. A safety chain hooking mechanism for hooking, holding and releasing a ring at the end of a trailer safety chain, comprising in combination, a body block having an opening in its outer face adapted to receive a safety chain ring, a hook prong on the lower face of said opening to receive and hook said chain ring; means for holding said ring on said hook prong and lifting it therefrom, including a vertically slidable latch block operative inwardly from said opening in said body block, having a horizontal notch adapted to receive the outer portion of a chain ring hooked over said hook prong and hold it down on said prong or lift it therefrom; a latch on said latch bar adapted to latch said latch block in raised open position to receive said ring, and to contact a chain ring inserted in said body block opening to unlatch said latching block and permit it to slide downward to closed position; a piston block operative vertically in said body having a pneumatically operated piston adapted to raise and lower it; and coupling means to couple said piston block to said latch block, including a coupling rod and an inwardly extending handle, and a spring normally holding said rod in coupling position.

3. A safety chain hook for automatically hooking and releasing a trailer safety chain end ring, comprising in combination, a body block having an outer face with means for attachment to a tractor vehicle, and having laterally disposed cheek plates defining its sides, and a centrally positioned opening in its outer face having a vertical hook prong extending upward from its bottom face adapted to engage a safety chain end ring; a C-shaped back closing plate having a vertical slot; a latch block vertically slidable in said body block between said cheeks and behind the outer face thereof, having a horizontal notch on its outer face adjacent said body block opening adapted to admit the outer portion of said chain ring and hold it on said hook or lift it therefrom; a vertically extending trigger bar, transversely pivoted on the outer face of said latch block having its upper portion extending vertically across said horizontal notch to contact said chain ring when inserted in said horizontal slot, and provided with a dog adapted to engage said hook to detain said latch block in open position with said horizontal slot above the end of said hook, and to release said latch block to closed position when said trigger is contacted by said chain ring; a piston block vertically slidable between said body block cheeks, having pneumatic means for effecting vertical movement and a boss extending outward through said slot in said C-shaped back closing plate; a coupling rod extending through said piston block from back to front adapted to releasably engage said latch block so that normally it will slide upward and downward with said piston block; and an uncoupling lever hinged to said boss and depending therefrom and connected to said coupling rod so that outward hinging motion will move said coupling rod outward to uncoupled position and upward motion of said lever will slide said piston block upward within said body block; a spring within said piston block adapted to maintain said coupling rod in coupled position, and an outwardly extending weighted bottom end portion on said lever adapted to keep said lever in a vertical position to maintain said coupling rod in coupling position with its inner end engaging said latch block.

4. A trailer safety chain latching hook, including a latching block body having means for attachment to a truck body, and an opening in its outer face, adapted to receive a safety chain coupling ring, an upwardly extending hook prong attached to the lower face of said opening in said latching block body over which said chain ring may be hooked, and a latch block vertically slidable within said block body and adapted to move from a raised open position downward to a latching position, having a horizontal slot in its outer face adapted to receive the extended portion of said chain ring when inserted in said opening and hold said ring down on said hook prong when moved downward to latching position, a trigger bar mounted on the forward portion of said latch block to swing toward and from said body block opening, having its upper portion positioned to be engaged by and pushed inward by said chain ring when inserted into said latch block notch, and having a dog adapted to engage said hook prong and hold said latch block in upper open position until dislodged by contact of the chain ring with said trigger bar when inserted in said latch block notch.

5. A trailer safety chain latching hook, including a latching block body having means for attachment to a truck body, and an opening having a lower face in the outer face of said block body, adapted to receive a safety chain coupling ring, an upwardly extending hook prong attached to the lower face of said opening within said block body, over which said chain ring may be hooked, and a latch block vertically slidable within said block body and adapted to move from a raised open position downward to a latching position, having a horizontal slot in its outer face adapted to receive the extended portion of said chain ring when inserted in said opening and hold said ring down on said hook prong when moved downward to latching position, a trigger bar mounted on the forward portion of said latch block to swing toward and from said body block opening, having its upper portion positioned to be engaged by and pushed inward by said chain ring when inserted into said latch block notch, and having a dog adapted to engage said hook prong and hold said latch block in upper open position until dislodged by contact of chain ring with said trigger bar when inserted in said latch block notch, and pneumatic means for moving said latch block upward and downward within said latching block body and means for uncoupling said pneumatic moving means from said latch block so that said latch block may be moved from open position to latched position independently thereof.

NEAL HUDSON.

REFERENCES CITED

The following references are of record in the file of this patent:

UNITED STATES PATENTS

| Number | Name | Date |
|---|---|---|
| 1,461,412 | Clement | July 10, 1923 |
| 1,939,463 | Rochinger | Dec. 12, 1933 |
| 2,441,285 | Pfeifer | May 11, 1948 |
| 2,478,736 | Balzer | Aug. 9, 1949 |

FOREIGN PATENTS

| Number | Country | Date |
|---|---|---|
| 639,396 | Germany | Dec. 4, 1936 |